(12) United States Patent
Rochester et al.

(10) Patent No.: US 7,132,758 B2
(45) Date of Patent: Nov. 7, 2006

(54) EXTRACTING POWER FROM A FLUID FLOW

(75) Inventors: Geoffrey Kenneth Rochester, London (GB); Keith Pullen, London (GB); John Hassard, London (GB)

(73) Assignee: Hydroventuri Limited, London (GB)

( * ) Notice: Subject to any disclaimer, the term of this patent is extended or adjusted under 35 U.S.C. 154(b) by 0 days.

(21) Appl. No.: 10/508,334

(22) PCT Filed: Mar. 19, 2003

(86) PCT No.: PCT/GB03/01173

§ 371 (c)(1),
(2), (4) Date: Nov. 30, 2004

(87) PCT Pub. No.: WO03/081030

PCT Pub. Date: Oct. 2, 2003

(65) Prior Publication Data

US 2005/0099011 A1  May 12, 2005

(30) Foreign Application Priority Data

Mar. 20, 2002 (GB) .................... 0206623.1

(51) Int. Cl.
*F03B 13/00* (2006.01)

(52) U.S. Cl. ............... 290/43; 290/52; 290/54; 290/53; 60/398; 415/2.1

(58) Field of Classification Search ........... 290/52, 290/54, 53, 43; 60/398; 415/2.1
See application file for complete search history.

(56) References Cited

U.S. PATENT DOCUMENTS

| 4,372,113 | A | | 2/1983 | Ramer |
| 4,868,408 | A | * | 9/1989 | Hesh .................... 290/52 |
| 5,071,548 | A | * | 12/1991 | Miller .................. 210/232 |
| 5,377,485 | A | | 1/1995 | Bellamy |
| 6,568,181 | B1 | * | 5/2003 | Hassard et al. .......... 60/398 |

FOREIGN PATENT DOCUMENTS

WO    99/66200 A    12/1999

* cited by examiner

*Primary Examiner*—Darren Schuberg
*Assistant Examiner*—Iraj A. Mohandesi
(74) *Attorney, Agent, or Firm*—Nixon & Vanderhye P.C.

(57) ABSTRACT

An apparatus for extracting power from a fluid flow comprises a fluid driveable engine, a conduit, disposed to enable fluid communication between a portion of the fluid flow, the fluid driveable engine and a transmission fluid, the fluid in the fluid flow and the transmission fluid being different fluids and the portion of the fluid flow being at a lower pressure than the transmission fluid by virtue of its flow rate, thus causing the transmission fluid to be drawn through the conduit to become entrained in the fluid flow, the fluid driveable engine being arranged such that the flow of the transmission fluid along the conduit acts to drive the fluid driveable engine.

14 Claims, 6 Drawing Sheets

EXTRACTING POWER FROM A FLUID FLOW

This application is the U.S. national phase of international application PCT/GB03/01173, filed 19 Mar. 2003, which designated the U.S. and claims priority to GB Application No. 0206623.1 filed 20 Mar. 2002. The entire contents of these applications are incorporated herein by reference.

This invention relates to apparatus for extracting power from a fluid flow, such as a tidal stream.

With increasing public awareness of environmental pollution and in particular, global warming there is a growing interest in renewable energy sources. A 1994 survey of the energy available in sea or river currents and tidal streams around the UK by the Department of Trade and Industry's renewable energy unit at Harwell found that a considerable fraction of the UK's energy needs could be met if this energy could be harnessed.

The energy in the currents is kinetic rather than potential, which means that it has to be extracted in a different way from that employed in a conventional hydroelectric scheme. Typically, in a tidal stream installation, a turbine might be placed underwater in the tidal stream to extract the energy—an underwater equivalent of a wind power generator. For example, in a development funded by the European Union (then the European Community), it was planned to set up submarine propeller-driven turbines in selected locations where the current flows rapidly.

A disadvantage of these conventional underwater systems is that in order to access the energy of the fluid flow the moving parts are placed underwater in a hostile environment, making them prone to damage and inconvenient and costly to access and repair. Furthermore, if the water is slowed too much (i.e. too big a fraction of the kinetic energy is extracted), then the head needed to drive it will be increased. To minimise the required head, thereby obviating the need for a barrage, any turbine placed in the stream will have to have its blades highly feathered, making it uneconomic.

A solution to these deficiencies was provided by WO 99/66200, which discloses a device for extracting energy from a fluid flow whereby the fluid is pumped away from the flow so that it can be led to a fluid driveable engine, such as a turbine, sited at a position remote from the underwater fluid flow. This solution avoided the requirement for moving parts underwater and the correspondingly high maintenance costs.

The above solution however is a relatively low pressure device, in which the water driving the fluid driveable engine flows fairly slowly (of order 5 m/s) in comparison with what is commonplace in a typical hydroelectric installation, This speed cannot be significantly increased by constricting the pipe diameter without introducing punitive power losses, and so only a low speed water turbine can be driven by this device. Such a turbine is not well matched to the requirements of an electrical generator, which may run at typically 1500 rpm. In order to supply a useful electrical output, a large and expensive gearbox would be needed.

WO 99/66200 discloses an embodiment of the above invention in which an alternative fluid to that present in the fluid flow is used to, drive the fluid driveable engine, providing a solution to these problems, but only at the expense of increasing the complexity of the apparatus and necessitating the inclusion of sealed containers underwater near to the fluid flow.

U.S. Pat. No. 5,377,485 discloses an electric power conversion system in which air is used to drive a turbine prior to being entrained in a fluid flow. In some embodiments a complicated switching arrangement is used to separate the air into packets within the fluid flow and avoid bubble formation.

Various respective aspects and features of the invention are defined in the appended claims.

According to one aspect of the present invention there is provided an apparatus for extracting power from a fluid flow, the apparatus comprising: a fluid driveable engine, a conduit, disposed to enable fluid communication between a portion of the fluid flow, the fluid driveable engine and a transmission fluid, the fluid in the fluid flow and the transmission fluid being different fluids the transmission fluid being a gas and the fluid flow being a liquid and the portion of the fluid flow being at a lower pressure than the transmission fluid by virtue of its flow rate, thus causing the transmission fluid to be drawn through the conduit, the transmission fluid exiting the conduit via a plurality of entrainment outlet to become entrained in the fluid flow, the fluid driveable engine being arranged such that the flow of the transmission fluid along the conduit acts to drive the fluid driveable engine, and the size of each of the plurality of entrainment outlets being that of a practical bubble size.

The apparatus of the present invention alleviates the disadvantages of the prior art by enabling an alternative fluid to that present in the fluid flow to drive the fluid driveable engine without the need for additional active components such as valves and large underwater structures such as containers The use of an alternative fluid as the drive fluid enables appropriate fluids to be chosen to provide advantages such as a reduction in frictional losses and/or reduction in corrosion or erosion suffered by the device.

In an embodiment of the invention, the transmission fluid comprises air. An advantage of this is that the frictional losses involved in transmitting air under pressure over a large distance are very much less than those involved in transmitting water. Another advantage of using air as the transmission fluid is that air can be entrained in (for example) seawater without causing a pollution problem. Additionally, an increase in flow rate could be achieved by forcing the transmission fluid to flow through a narrow constriction without significant turbulent losses, where it could be used to drive a high-speed turbine, obviating the need for a gearbox. Furthermore, if the system is driving a gas turbine, this arrangement acts to produce a reduced exhaust pressure for the gas turbine, which increases its efficiency. It should be noted that this system is highly compatible with a gas turbine generator, in which hydrocarbons are used to supplement, say tidal energy.

Embodiments of the present invention will now be described, by way of example only, with reference to the accompanying drawings, in which:

FIG. 6 schematically illustrates an embodiment similar to that of FIG. 5, except that a cold exhaust from the air turbine is instead used to drive neighbourhood air conditioners or the like.

Figure 1:
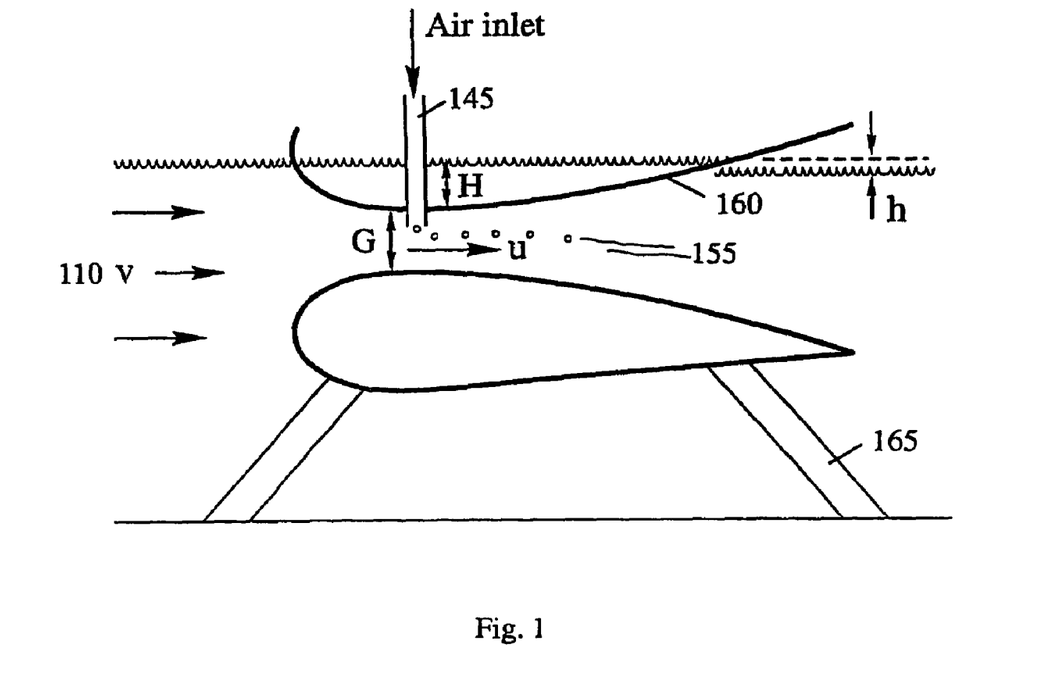
FIG. 1 schematically illustrates a venturi apparatus in which air is entrained into a fluid flow.

Referring now to FIG. 1, a venturi apparatus is shown in which a fluid flow 110 such as a river flow or sea current is directed past a fluid directing formation 160 forming a constriction in the path of the fluid flow. In the example of FIG. 1, the fluid directing formation is in two parts which smoothly constrict the path of the fluid to a vertical dimension of G. The two parts, one of which is schematically shown as being supported from the river or sea bed on supports 165, are shaped rather like an aeroplane wing in cross section, which tends to make the arrangement work well for fluid flow from left to right in the diagram. However, many other shapes, including shapes giving a left-to-right symmetrical constriction (i.e. one which works equally well with either flow direction) may be used. The fluid velocity is represented as v outside the venturi and u inside.

The fluid directing formation 160 acts to speed up the flow through the constriction, and so, by the Bernoulli effect, reduces the fluid pressure at the constriction.

An air inlet conduit 145 allows air to flow from the atmosphere to the constriction in the fluid flow 110. The reduced pressure at the constriction tends to draw air from the conduit 145 into the fluid flow, in the form of entrained bubbles 155.

For air to be drawn below the fluid surface through the conduit 145, the suction pressure P must exceed the pressure difference between the surface of the water and the depth at the bottom of the conduit 145.

The suction pressure P can be expected to be about 5 $\rho gh$, where $\rho gh$ is the pressure due to the head of water generated across the venturi arrangement by its resistance to the flow. The pressure difference due to depth is $\rho gH$. As the river or sea level rises or falls in the normal course of events, both H and h increase, so that the system can work over a reasonable range of fluid levels.

This example illustrates a general principle which will be used in various embodiments to be described below. However, it is also useful in its own right, as it illustrates a way in which a river can be aerated, for example to improve the health of aquatic life.

Figure 2:
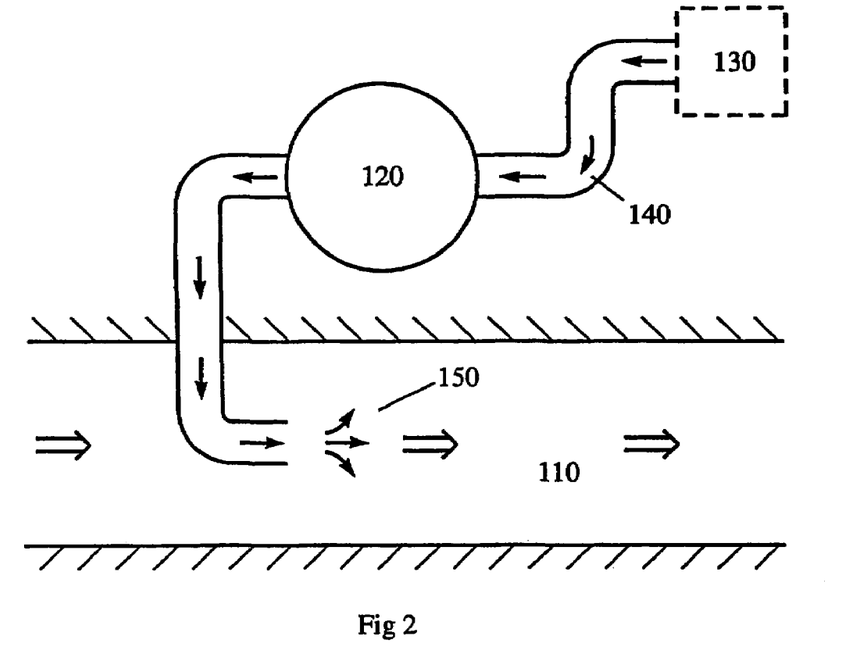
FIG. 2 schematically illustrates an apparatus for extracting power from a fluid flow.

FIG. 2 takes this technique one stage further and schematically illustrates an apparatus for extracting power from a primary fluid flow. In FIG. 2, a fluid flow 110 (again, a river or a sea current would be significant examples) entrains a secondary fluid at an entrainment outlet 150. A pressure difference is maintained between the points 130 and 150, for example by maintaining a siphon arrangement including the nozzle 150. The nozzle 150 may have a diameter of, for example, 1 inch.

The secondary fluid could well be air, as this is a cheap and environmentally friendly fluid to entrain into natural waterways, but other entrainment fluids could be used which may or may not be less dense than the primary fluid. In general, any fluid may be entrained with any other, provided the primary fluid is moving and the secondary fluid is being driven into the flow, or sucked in by some pressure difference. If a secondary fluid other than air is used, a secondary fluid source 130 such as a tank or pressurised vessel can be provided. If air is used, and the point of entrainment is at less than atmospheric pressure, the source 130 can be implemented just as a vent to the atmosphere.

As the secondary fluid is entrained in the primary fluid flow, it passes along a secondary circuit formed of conduits 140 in the direction shown by the arrows. In doing so, its flow can drive a fluid driveable engine 120 such as a turbine. In this way, useful work can be extracted from the primary fluid flow by the entrainment (and therefore movement) of a secondary fluid in a secondary circuit. Clearly, the fluid driveable engine could drive, for example, an electrical generator, a fan, a pump, a winch or the like (not shown).

Figure 3:
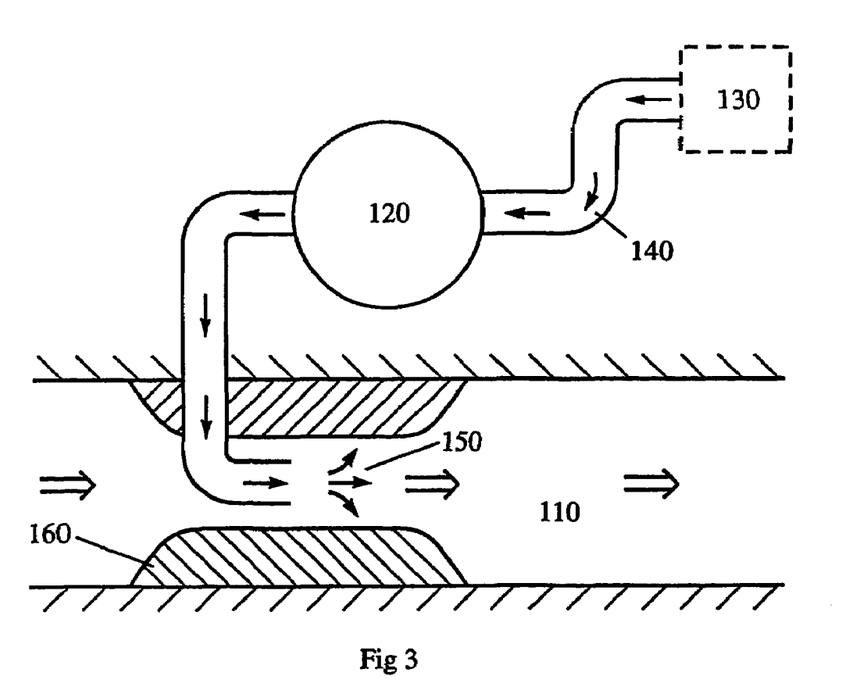
FIG. 3 schematically illustrates an embodiment of the invention in which one or more fluid directing formations result in a venturi constriction being formed in the fluid flow.

FIG. 3 schematically illustrates a similar arrangement in which a fluid directing formation 160 (shown in this drawing as a left-right symmetrical formation) acts to constrict the primary fluid's flow path so as to accelerate the primary fluid and reduce the primary fluid pressure at the entrainment outlet. This tends to increase the entrainment of the secondary fluid and therefore its flow rate through the secondary circuit. In turn, the increased flow rate allows more useful power to be extracted by the fluid driveable engine 120. For example, the primary fluid flow may flow through a cross-sectional area of 1.5 m, narrowing to 0.75 m at the Venturi constriction caused by the fluid directing formations.

Figure 4:
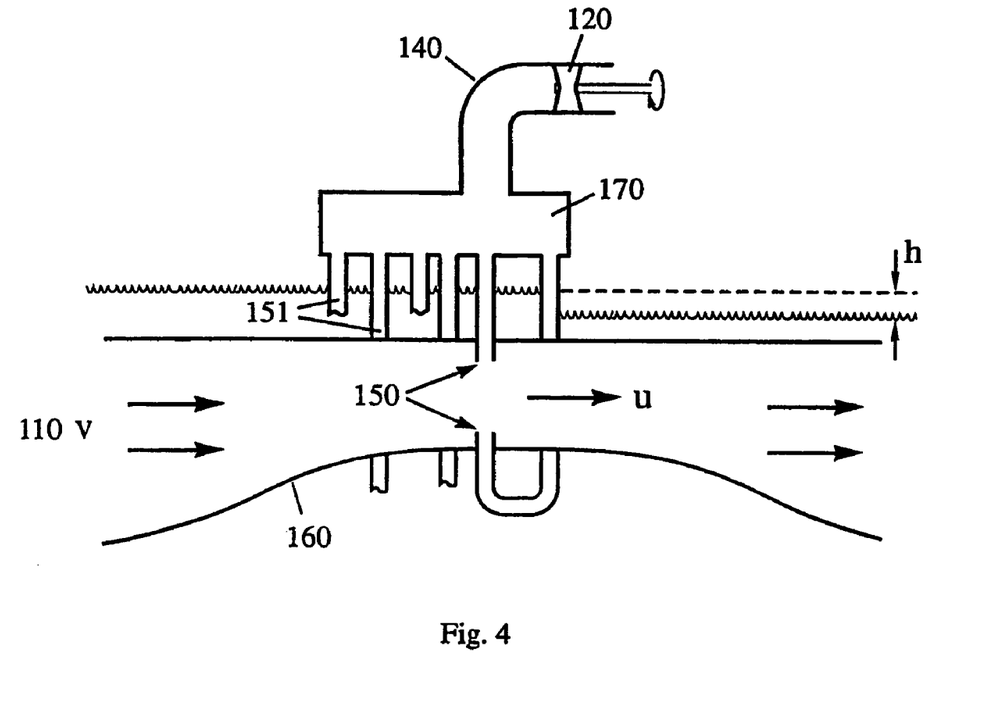
FIG. 4 schematically illustrates another form of the apparatus of FIG. 3.

FIG. 4 schematically illustrates another example of the apparatus shown in FIG. 3. The conduit 140 is linked to a manifold 170 from which a number of smaller conduits pass. A number of these smaller conduits form a corresponding number of entrainment outlets 150, 151. This can improve the efficiency of entrainment by more closely matching the entrainment outlet size (e.g<1 mm) to a practical bubble size. A further number of the smaller conduits from the manifold 170 can connect to other Venturi's working in parallel. Multiple manifolds can be used, or manifolds 151 linked to separate Venturi arrangements all of which can be linked to a single fluid driveable engine 120.

The conduits feeding the outlets have an area of cross-section which is approximately the same as the sum of all the outlet areas. The outlets may be in a ring, in the case of a cylindrical Venturi, about 1 inch apart.

If the purpose of admitting air to the flow is aeration, then air is best admitted via a large number of small orifices, or even through a porous material such as a porous stone. This keeps the bubble size low. If the purpose is to generate air (pneumatic) power, the bubbles can be bigger, but small bubbles are generally better than big bubbles because the speed at which they rise is less. In all cases, the amount of secondary fluid entrained will increase with the number and size of the inlet conduits, until the point is reached when the primary flow is being disrupted.

Figure 5:
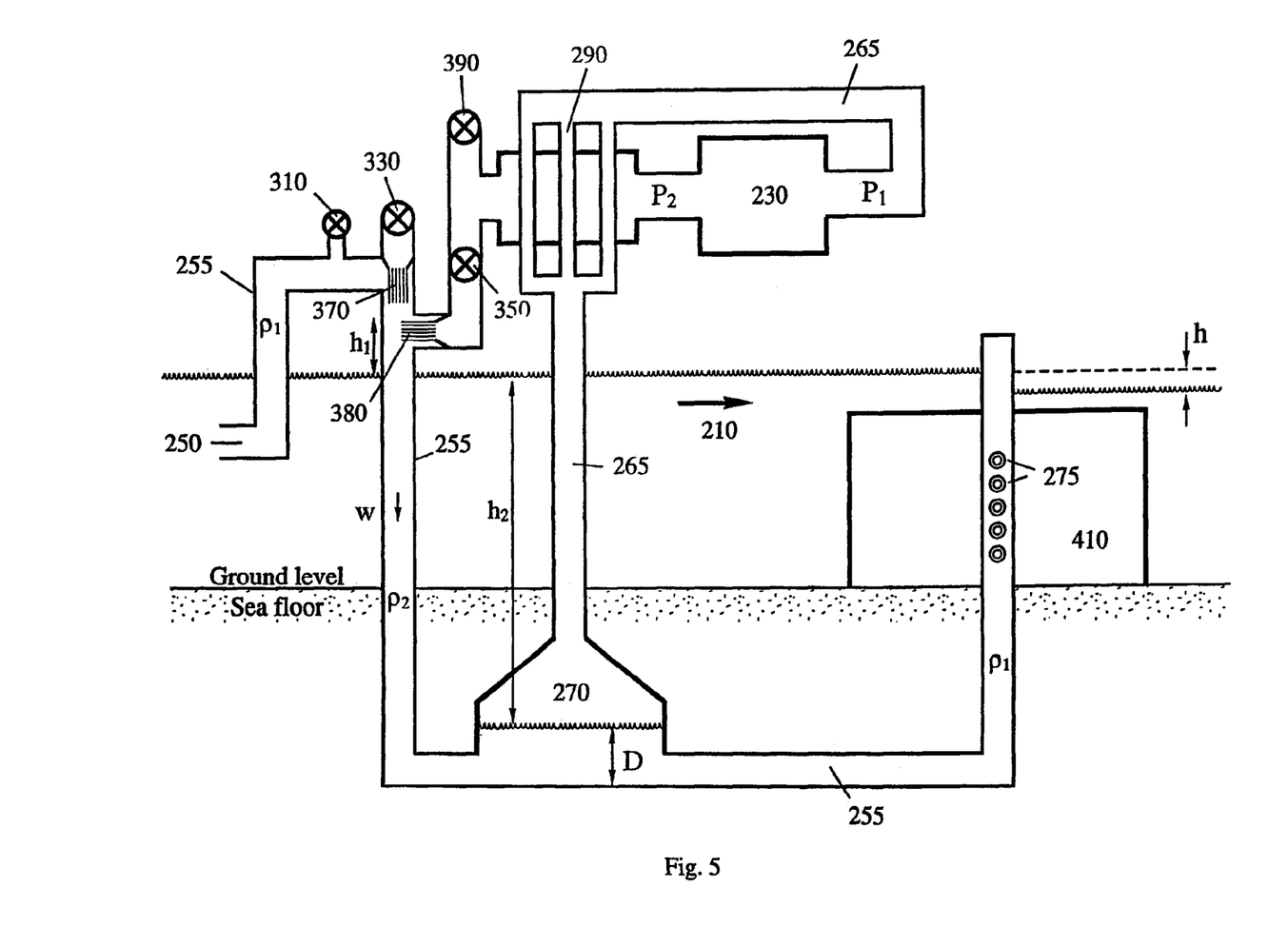
FIG. 5 schematically illustrates an apparatus for extracting power and for dehumidifying air in an air circuit, according to an embodiment of the invention.

FIG. 5 schematically illustrates an apparatus for extracting power and for dehumidifying air in an air circuit.

In FIG. 5, a primary fluid (in this example, the sea) flows in a flow direction 210. The primary fluid also flows through a primary fluid circuit formed of an inlet 250, conduits 255, a tank 270 and outlets 275. The outlets 275 are disposed in a venturi arrangement 410 formed of fluid directing formations (not shown) constricting the flow path of the primary fluid so as to increase its velocity and decrease its pressure. So, the flow of the primary fluid through the primary fluid circuit is driven by the pressure difference between the (higher) pressure at the inlet 250 and the (lower) pressure at the outlets 275. It may also be assisted by the fact that the inlet 250 preferably faces into the oncoming flow of the primary fluid.

A secondary fluid (e.g. air) flows around a secondary fluid circuit comprising conduits 265, a heat exchanger 290, a fluid driveable engine (e.g. a turbine) 230, and a nozzle 380. The nozzle 380 is disposed in the flow path of the primary fluid in the primary fluid circuit. So, the flow of the secondary fluid is as follows. The secondary fluid is drawn into and entrained in the flow of the primary fluid at the nozzle 380, by the negative hydrostatic pressure $\rho_0 g h_c$ at that point inside the siphon arrangement. The secondary fluid is drawn down to the tank 270 in the form of entrained bubbles. In the tank 270, there is the opportunity for these entrained bubbles to come out of the primary fluid. The secondary fluid released in this way passes up to the heat exchanger 290 and from there to the fluid driveable engine 230. At the exhaust (left hand) end of the fluid driveable engine 230, the secondary fluid passes, via a valve 350, back to the nozzle 380.

So, in basic terms the system operates in a similar manner to those described above, in that the fluid driveable engine 230 is driven by the flow of the secondary fluid to extract useful power from the main flow 210 of the primary fluid. The secondary fluid is itself driven by the flow of the primary fluid through a primary fluid circuit, effectively by a siphon arrangement.

Vent valves 310, 330 and 390 allow excess air or water to be vented to the atmosphere or allow extra air to be introduced at various points in the system.

The entrained bubbles can be carried downwards by the primary fluid flow as long as that flow is more than about 0.2 m/s. This is because the speed at which bubbles rise in still water is of the order of 0.2 m/s. In fact, a downward primary fluid velocity of several m/s could be expected. The speed of this downward flow can be expected to reduce near to the walls of the conduit, so bubbles which stray far from the axis may no longer be carried downwards. To avoid this problem, bubbles could be retained nearer to the axis of the conduit by using internal vanes or similar fluid directing formations to make the downward flowing fluid spin slightly about a longitudinal (vertical) axis.

For this arrangement to work, the suction provided by the venturi arrangement has to overcome the differential hydraulic pressure $g(h_1+h_2)(\rho_1-\rho_2)$ where $\rho_1$ is the density of water and $\rho_2$ is the average density of a column of water with entrained bubbles. By adjusting the rate at which the secondary fluid flows in, a good match can be obtained between the differential hydraulic pressure and the suction from the venturi arrangement, providing efficient power transfer.

In an ideal (theoretical no-losses) situation, the head of water $\Delta H$ (approx 5 h) across the venturi arrangement is entirely due to the load imposed on it by drawing down water loaded with bubbles.

However, there is also another beneficial effect of this apparatus. This is that the air passing up from the tank 270, which will be damp air having been entrained in the water flow, is at least partially freeze-dried by the cool air generated by expansion through the fluid-driveable engine (e.g. a turbine such as a rotary vane turbine, a reciprocating engine such as a piston in a cylinder, or a liquid ring expander). The purpose of drying the air is to increase the life of the fluid-driveable engine by removing the water at its input, which water may be salty in the case of a marine installation. Considering the example of a turbine, as the air temperature goes down when the air expands through the turbine, any water vapour in the air would freeze bringing the salt out of solution. Unless action (such as pre-drying the air) is taken, the high speed turbine blades would be bombarded by ice crystals and salt crystals, which could lead to rapid erosion.

Figure 6:
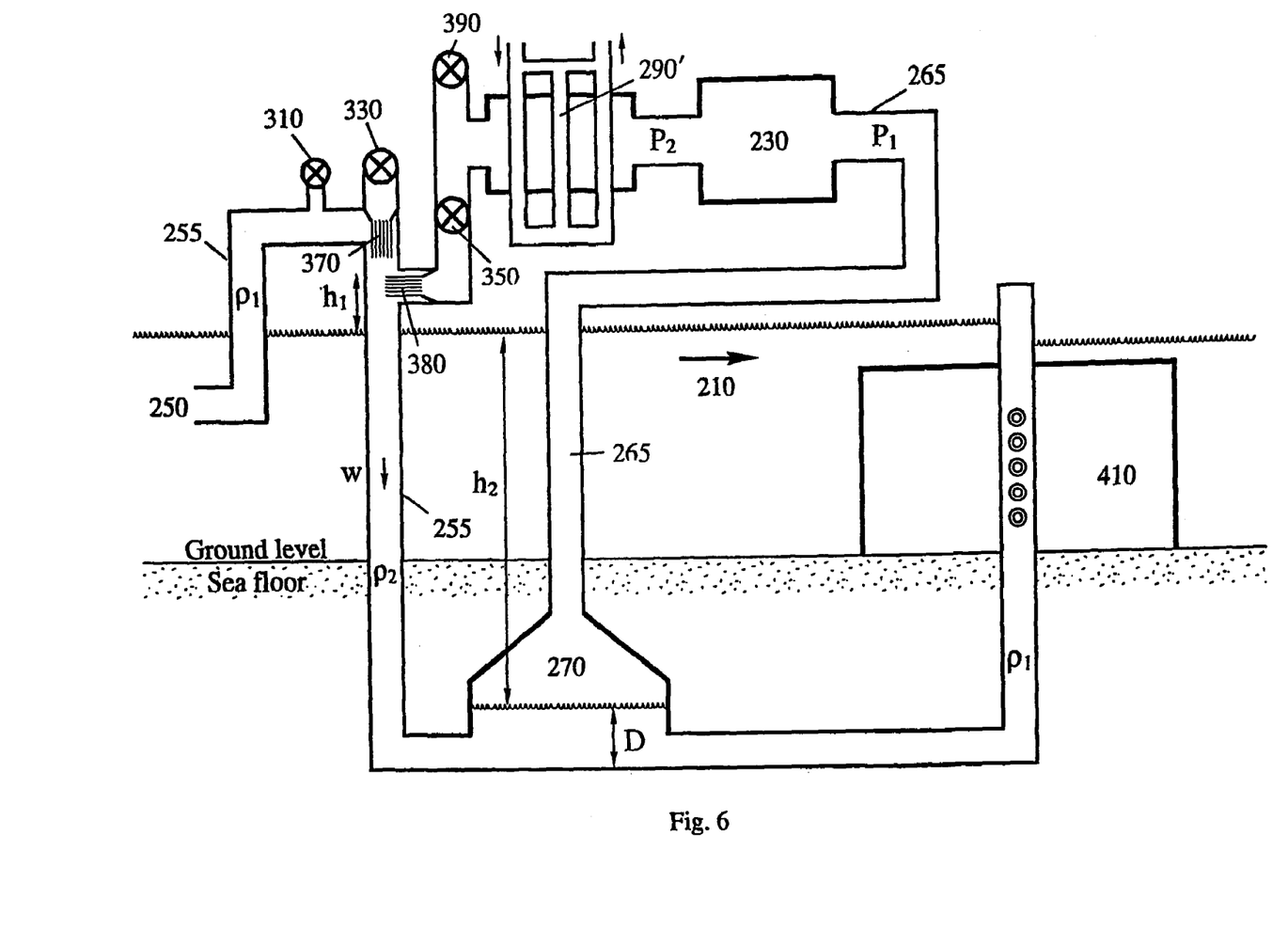

FIG. 6 schematically illustrates a very similar system, except that a heat exchanger 290' is connected to a heat exchange circuit (e.g. a chilled water circuit) of a nearby plant such as an air conditioning plant. So, the expansion through the fluid driveable engine 230 provides cooling which can be utilised in the nearby plant. This benefit is in addition to the power generated from the fluid driveable engine 230.

Figure 7:
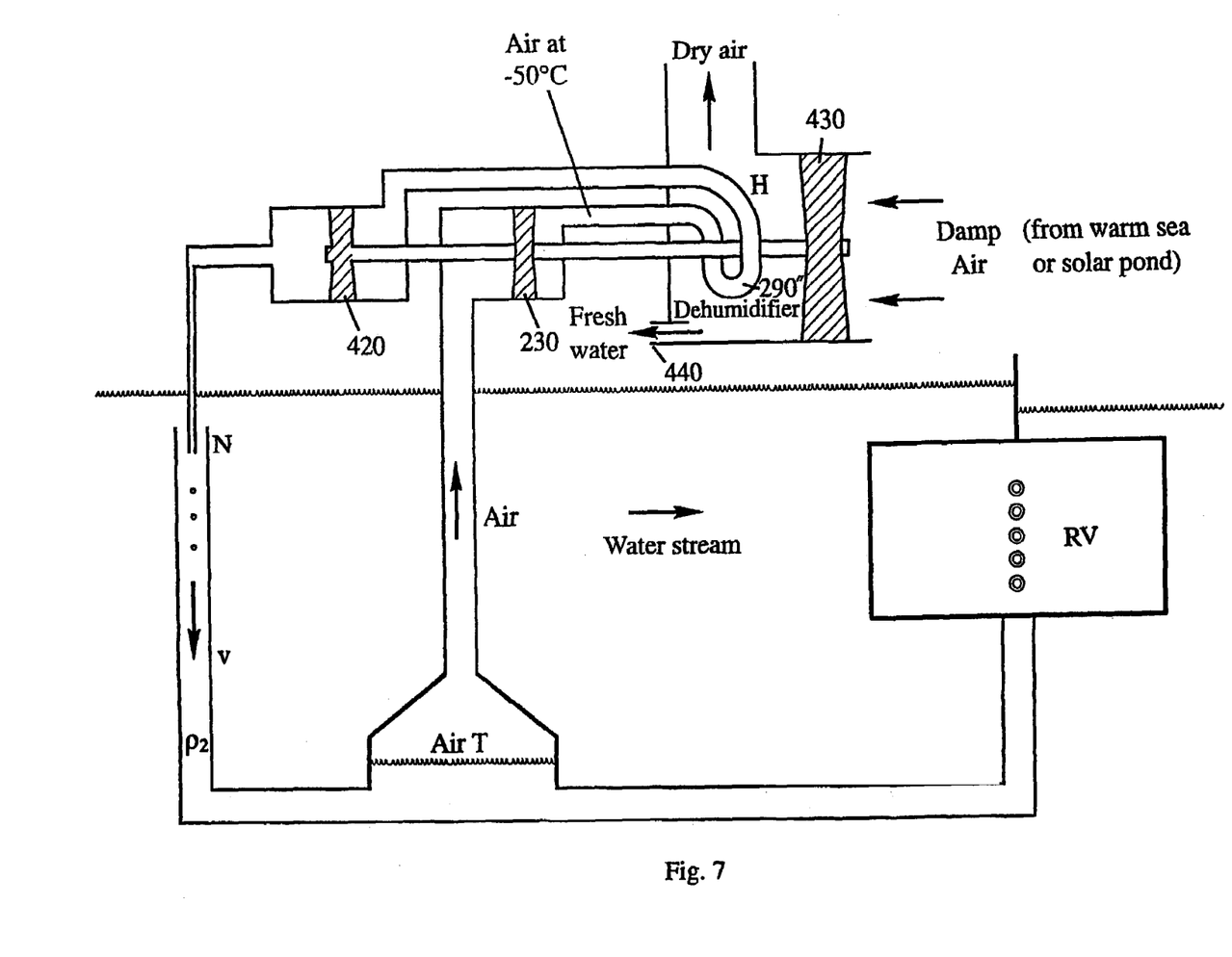
FIG. 7 schematically illustrates a desalination plant.

FIG. 7 schematically illustrates a desalination plant using some of these principles. The main differences between FIG. 7 and FIG. 5 are that a compressor 420 and a fan 430 are driven by the fluid driveable engine 230 (ideally, instead of any other load such as a generator). The compressor 420 tends to compress the air to be entrained into a downward primary fluid flow, increasing the entrainment efficiency. The fan 430 draws damp air from a warm sea breeze or a solar pond over a beat exchanger 290" carrying cool air from the exhaust of the fluid driveable engine. As the warm damp air passes over the heat exchanger 290", at least a part of the moisture it carries condenses to form fresh water which emerges at an outlet 440.

The invention claimed is:

1. An apparatus for extracting power from a fluid flow, the apparatus comprising:
a fluid driveable engine,
a conduit, said conduit disposed to enable fluid communication between a portion of the fluid flow, the fluid driveable engine and a transmission fluid, the transmission fluid being a gas and the fluid flow being a liquid, a portion of the fluid flow being at a lower pressure than the pressure of the transmission fluid by virtue of the fluid flow rate, thus causing the transmission fluid to be drawn through the conduit, said transmission fluid exiting the conduit via a plurality of entrainment outlets to become entrained in the fluid flow, the fluid driveable engine being arranged such that the flow of the transmission fluid along the conduit acts to drive the fluid driveable engine.

2. Apparatus as claimed in claim 1, comprising:
at least one fluid directing formation formed to define a channel in the fluid flow having a flow accelerating constriction shaped such that the fluid in the channel, is caused to accelerate as it flows through the flow accelerating constriction of the channel.

3. Apparatus according to claim 1, in which the fluid flow comprises a flow along a conduit between two positions in a fluid stream, a conduit inlet position being at a higher fluid pressure than a conduit outlet position by virtue of a lower pressure velocity at the conduit outlet position.

4. Apparatus according to claim 3, comprising a fluid directing formation for constricting the fluid stream at the conduit outlet position with respect to the fluid stream at the conduit inlet position.

5. Apparatus as claimed in claim 1, wherein the fluid flow comprises a flow of water.

6. Apparatus as claimed in claim 1, wherein the transmission fluid comprises air.

7. Apparatus according to claim 1, in which the fluid driveable engine comprises a turbine.

8. Apparatus according to claim 7, comprising a heat exchanger in the transmission fluid flow path at a transmission fluid exhaust of the turbine.

9. Apparatus according to claim 8, in which the heat exchanger is arranged to cool the transmission fluid.

10. Apparatus according to claim 8, in which the heat exchanger is arranged to cool a further transmission fluid in communication with external plant.

11. Apparatus according to claim 8, in which the heat exchanger is arranged to condense water vapour from ambient air.

12. Apparatus according to claim 1, wherein the conduit is linked to manifold from which a plurality of smaller conduits pass, each of said smaller conduits comprising an entrainment outlet.

13. Apparatus according to claim 1, wherein said plurality of entrainment outlets are formed within a porous material.

14. Apparatus according to claim 1, the conduit comprising fluid directing formation, the fluid direction formations being arranged so as to cause downward flowing fluid to spin about a longitudinal axis.

* * * * *